United States Patent [19]

Lee et al.

[11] Patent Number: 4,884,443

[45] Date of Patent: Dec. 5, 1989

[54] CONTROL AND DETECTION CIRCUITRY FOR MASS AIRFLOW SENSORS

[75] Inventors: Ki W. Lee, Williamsburg; Charles R. Cook Jr., Newport News, both of Va.

[73] Assignee: Siemens-Bendix Automotive Electronics L. P., Troy, Mich.

[21] Appl. No.: 137,220

[22] Filed: Dec. 23, 1987

[51] Int. Cl.$^4$ ............................................. G01F 1/68
[52] U.S. Cl. .......................... 73/204.16; 73/204.19; 73/204.26
[58] Field of Search .............. 73/204, 204.16, 204.19, 73/204.26

[56] References Cited

U.S. PATENT DOCUMENTS

| | | | |
|---|---|---|---|
| 3,623,364 | 11/1971 | Withrow | 73/204 |
| 3,992,940 | 11/1976 | Platzer Jr. | 73/204 |
| 4,135,396 | 1/1979 | Stante et al. | 73/204 |
| 4,244,217 | 1/1981 | Ledbetter | 73/204 |
| 4,283,944 | 8/1981 | Gruner et al. | 73/204.19 |
| 4,471,647 | 9/1984 | Jerman et al. | 73/204 |
| 4,478,076 | 10/1984 | Bohrer | 73/204.16 |
| 4,548,077 | 10/1985 | van Putten | 73/204 |
| 4,566,320 | 1/1986 | Bohrer | 73/204 |
| 4,587,842 | 5/1986 | Handtmann | 73/204 |
| 4,596,140 | 6/1986 | Dorman et al. | 73/204 |
| 4,624,138 | 11/1986 | Ono et al. | 73/204 |
| 4,637,253 | 1/1987 | Sekimura et al. | 73/204 |
| 4,672,847 | 6/1987 | Uchiyama et al. | 73/204 |
| 4,680,963 | 7/1987 | Tabata et al. | 73/204 |
| 4,733,559 | 3/1988 | Tine et al. | 73/204 |

Primary Examiner—Herbert Goldstein
Attorney, Agent, or Firm—Russel C. Wells; George L. Boller

[57] ABSTRACT

A mass airflow sensor is disclosed which uses a small, thin dielectric diaphragm providing good thermal isolation for thin-film heating and temperature sensing elements, resulting in high flow sensitivity and low current operation of the heating element. The dielectric diaphragm is bounded by a p-etch-stopped silicon rim. The mass airflow sensor includes a primary sensor circuit which maintains a heated primary temperature sensing element and an ambient air temperature sensing element at a constant temperature difference. A slave sensor circuit, which includes a plurality temperature sensing elements, monitors heat loss due to airflow at a particular location on the diaphragm and generates an output signal indicative of airflow which is independent of ambient air temperature.

33 Claims, 2 Drawing Sheets

4,884,443

CONTROL AND DETECTION CIRCUITRY FOR MASS AIRFLOW SENSORS

CROSS REFERENCE TO RELATED APPLICATIONS

This application is related to the application by Ki Won Lee et al entitled "A Si-Based Mass Airflow Sensor and Fabrication Method" Ser. No. 07/137,299, filed on even date herewith; the application of Ki Won Lee entitled "Silicon Based Sensors and Method of Making Same" Ser. No. 07/137,219 and filed on even date herewith and the application of John S. Bergstrom entitled "Planar Mounting of Silicon Sensors for Pressure and Airflow Measurement", filed on even date herewith.

FIELD OF THE INVENTION

This invention relates to mass airflow sensors. More particularly, the invention relates to a silicon-based mass airflow sensor with temperature control and detection circuitry that is relatively insensitive to changes in ambient temperature and which has a high flow sensitivity and fast response speed compatible with industrial and automobile microprocessor-based real time control systems.

BACKGROUND AND SUMMARY OF THE INVENTION

The automotive industry in recent years has recognized the advantages of using electronic fuel management systems to improve vehicle performance over mechanically based fuel control systems. It has been predicted in view of the success of such electronic fuel management systems that in the not too distant future all major automobile manufacturers will turn to electronic control systems for monitoring and controlling major automobile subsystems.

To increase fuel efficiency and to meet tighter emission requirements such next generation electronic control systems will need more advanced and highly sophisticated sensors that can be cost effectively manufactured. The microprocessor, which is the heart of such an electronic control system, is capable of executing instructions on the order of magnitude of one million per second. A need has therefore arisen for mechanically rugged and reliable sensors which have an extremely fast response time. Prior to the present invention, such sensors have been performance limiting factors which have caused delay in the development and implementation of cost effective integrated vehicle control systems.

In electronic fuel management control systems, to provide the required fuel-to-air ratio, it is necessary for the control system to be fed mass airflow rate data. With such data, the controlling microprocessor calculates the amount of fuel needed under the then existing operating conditions to generate a fuel injection control signal.

Prior art mass airflow sensors typically are of the thin-wire or thin-film type. The thin-wire type of sensor is fabricated with a fine resistive wire such as platinum or tungsten wound on a ceramic bobbin. In operation, a predetermined current flows through the wire to heat the resistive wire to a preset temperature. Any airflow alters the rate of heat transfer from the heated wire, thereby causing a wire temperature/resistance change. Readout electronic circuitry converts this temperature/resistance change into current or voltage changes from which airflow rate may be determined in a manner well known to those skilled in the art.

The thin-wire type of sensor shows critical limitations in electronic fuel management control applications. In this regard, due to the sensor's significant thermal mass, its speed of response is too slow for effective microprocessor-based real time flow control. Additionally, the use of such thin-wire type sensors renders the overall sensor more bulky than desired. Under some noisy environments, the thin-wire type of sensor transmits noise to the external circuit to thereby limit the sensor's flow resolution and accuracy.

An exemplary prior art thin-film type of sensor is manufactured by Honeywell and referred to as the microswitch and mass airflow sensor. This sensor includes a "bridge" on the front side of the device which is fabricated by undercutting the wafer substrate from the front side of the wafer.

This "bridge" type of thin-film sensor has a number of disadvantages. The sensor is very sensitive to the direction of airflow over the bridge and the manner in which the sensor device is mounted. Accordingly, it is difficult to achieve precisely reproducible results from sensor to sensor rendering the sensor difficult to calibrate. Furthermore, the bridge structure is not as structurally strong or as rugged as the sensor of the present invention. Additionally, the "bridge" thin-film sensor includes an air channel which is built into the silicon wafer. This tiny air channel (which is required due to the design of the "bridge" type sensor) limits the dynamic range of the sensor such that very high airflow rates cannot be accurately detected.

The present exemplary embodiment is a silicon-based mass airflow sensor which has a high flow sensitivity, high speed of response and sufficient mechanical ruggedness and reliability to be fully compatible with automobile and other industrial fluid flow control systems (e.g., where sensed gas flow rate is used to control gas flow). The mass airflow sensor of the present invention is fabricated using silicon micromachining and integrated circuit techniques which allow the sensor to be reliable, compact and cost-effectively manufactured.

The present invention is a thin-film type of sensor having significant advantages over prior art sensors of the nature discussed above. The present invention uses a small, thin dielectric diaphragm providing good thermal isolation for thin-film heating and temperature sensing elements, resulting in high flow sensitivity and low current operation of the heating element. The dielectric diaphragm is bounded by a p-etch-stopped silicon rim. The thermal mass of the diaphragm is so low that the speed of the sensor response to airflow change is much faster than prior art sensor response times. The heating and temperature sensing thin-film elements are advantageously configured and controlled to generate readings which are accurate notwithstanding variations in ambient air temperature.

In contrast to the "bridge" type sensors, the present invention has a wide dynamic range of airflow which can be accurately detected (in part because it does not require such a small airflow channel). Additionally, the present invention is not nearly as sensitive to airflow direction as the "bridge" type sensor.

Mass airflow sensors operate in environments in which the ambient air temperature may vary over a wide range. It is, of course, important for a mass airflow to generate accurate airflow readings notwithstanding whether the ambient temperature is 0° C. or 100° C.

Prior art mass airflow sensors are highly dependent on the ambient air temperature. Such sensors typically use a heated resistance element. Additionally, such sensors may utilize temperature sensing elements disposed adjacent to the heated resistance element. In such sensors, the sensing elements detect the heat loss or transfer due to heat flow through the air. Such sensors are highly dependent on ambient air temperature and require additional circuitry to compensate for variations in ambient air.

In contrast, the present invention, due to its unique design is relatively independent of ambient air temperature variations and, typically requires no additional ambient air temperature compensation circuitry. In the present invention, a primary sensor circuit maintains a heating or heated element and an ambient air temperature sensing element at a constant temperature difference. A slave sensor circuit which also includes temperature sensing elements monitors heat loss due to flow at a particular location on the diaphragm. This slave circuit temperature sensing element does not monitor the amount of heat transferred from the heating element through the air, but rather is used to monitor temperature difference as a function of airflow in a manner explained in detail below.

The primary circuit, by maintaining a predetermined constant temperature difference between the heating or heated element and an ambient air temperature sensing element, keeps the heating or heated element at a fixed temperature ($T_{FIXED}$) above the ambient air temperature. At the same time, the primary circuit functions to keep the temperature of the slave circuit temperature sensing element at a fixed temperature offset (related to $T_{FIXED}$) above the ambient air temperature reduced by a temperature change due directly to airflow.

The slave circuit utilizes an operational amplifier whose inverting and non-inverting inputs each receive ambient air temperature related signals to thereby cancel the effect of ambient air temperature. The output voltage of the slave circuit is a signal which is indicative primarily of airflow.

The primary sensor circuit does not monitor the current through the resistance heating element (as was typical of many prior art sensors) but rather monitors and maintains a predetermined temperature difference between the primary ambient temperature sensing element and the heated element. This configuration helps to render the circuit relatively immune to long term sensor drift problems arising from the thermal characteristics of the diaphragm, dust build-up or material changes in the heating resistance over time. Sensors which monitor the current through the heating resistance are in contrast highly sensitive to such dust build-up problems or the change in the heating element resistance over time.

Additionally, in the present exemplary embodiment, the circuit elements built into the sensor structure have been selected to establish common-mode rejection of temperature dependence. In this regard, identical thin-film temperature sensing resistors are used which have the same "cold" resistance values. These well-matched elements will, therefore, react to changes in ambient temperature in a uniform manner. In the present sensor, such well-matched elements yield accurate airflow measurements whether the ambient temperature is 0° C. or 100° C.

BRIEF DESCRIPTION OF THE DRAWINGS

These as well as other features of this invention will be better appreciated by reading the following detailed description of the presently preferred embodiment taken in conjunction with accompanying drawings of which.

DETAILED DESCRIPTION OF THE DRAWINGS

Figure 1:
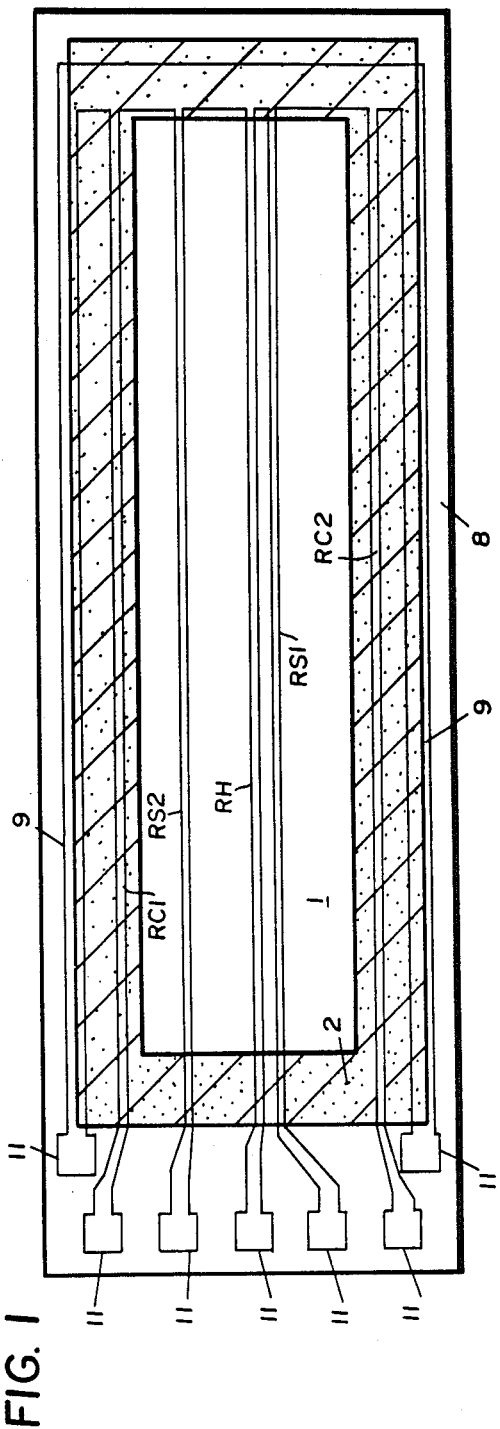
FIG. 1 is a plan view of the mass air flow sensor depicting the heating and temperature sensing element configuration in accordance with an exemplary embodiment of the present invention.

Turning to FIG. 1, a mass airflow sensor in accordance with an exemplary embodiment of the present invention is shown. The sensor, which may be, for example, 2 mm wide by 4–8 mm long, includes a thin diaphragm window 1 comprised of a sandwich structure of silicon dioxide and silicon nitride.

The sandwich structure, which extends the length of the sensor, advantageously provides thermal stress relief, mechanical ruggedness and structural integrity.

This thin dielectric diaphragm structure provides good electric insulation and the necessary thermal isolation of the heating element RH and the ambient air temperature sensing elements RC1 and RC2 which are described further below. Such thermal isolation provides the sensor with a high flow sensitivity and allows for low current operation of the heating element RH. As noted above, the thermal mass of the diaphragm structure is so low that the speed of the sensor in responding to airflow change is very fast and compatible with the needs of a real time microprocessor-based fuel management control system.

The diaphragm window 1 is surrounded by a heavily-p-doped silicon rim 2 which is embedded in a silicon substrate 8. As will be explained further below, the heavily-p-doped silicon rim 2 allows the diaphragm window 1 to be shaped as desired and permits the diaphragm dimensions to be accurately controlled regardless of the thickness variations of the silicon substrate. The silicon rim 2 further serves to reduce the performance sensitivity of the sensor to front-backside photolithographic misalignment.

Metal thin-film elements RH, RS2, RS1, RC1, RC2 and 9 are formed on top of the sensor surface with the metal lines RH, RS2 and RS1 being disposed directly on top of the dielectric diaphragm 1. As shown in FIG. 1, thin-film element RH is substantially disposed along the longitudinal axis of the sensor. The metal thin-film lines may, for example, be gold and chromium based and are on the order of a micron thick. The chromium layer is used as an adhesive between the silicon oxide of the diaphragm structure and the gold. Each thin-film line has an associated bonding pad 11. Additionally, the metal lines are covered with a plasma deposited silicon nitride film for passivation.

Functionally, the metal pattern RH on the diaphragm serves as a heating element and the metal patterns RS1 and RS2 serve as downstream and upstream temperature sensing elements, respectively. Metal pattern RS2 is referred to as an upstream sensing element relative to sensing element RS1 because the sensor is typically disposed such that air flows from the top of the sensor to the bottom. Thus, the airflow strikes element RS2 before element RS1. The metal patterns RC1 and RC2 serve as temperature-sensing elements which are used to determine (and compensate for) the ambient air temperature. Metal patterns 9, which may be disposed wholly over the silicon rim 2 or the substrate 8 or as shown, serve as a common ground to which all the thin-film elements are connected. The common ground elements 9 typically carry more current than the other thin-film elements and are wider than such elements so that they do not heat up to an undesired degree.

A gold-based metal system is used for the heating and temperature sensing elements since gold provides good resistance against environmental corrosion and process etching chemicals (which simplifies the fabrication process and improves fabrication yield). Additional metals such as chromium, molybdenum, or titanium are preferably used to provide the necessary good adhesion between the gold layer and the silicon oxide layer. This metal system provides such good ohmic contact to silicon and has such a low resistivity that it can be used as an interconnection system for an on-chip sensor readout circuit, as will be described further below.

Figure 2:
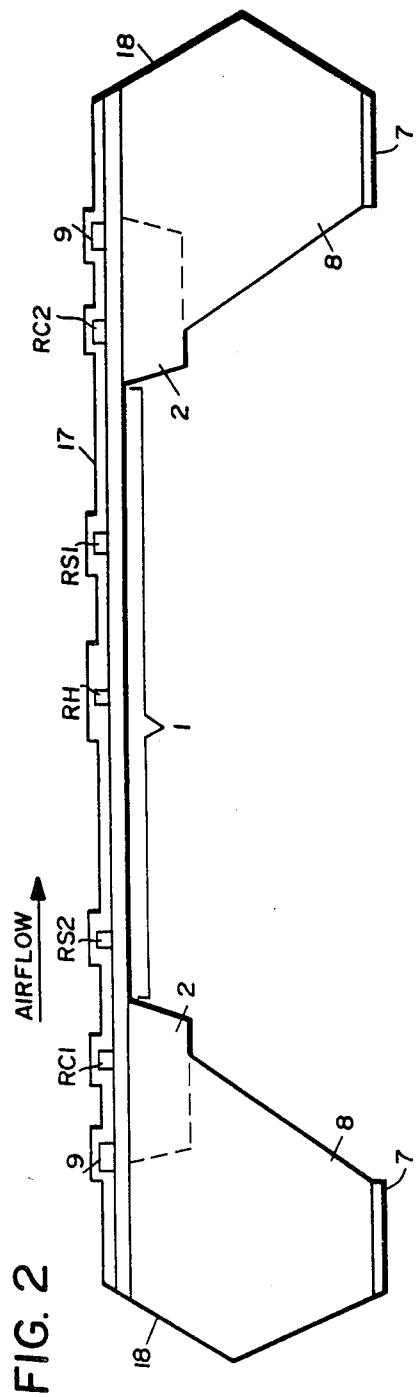
FIG. 2 is a simplified cross-sectional view of a mass airflow sensor in accordance with exemplary embodiment of the invention shown in FIG. 1.

FIG. 2 is a simplified cross-sectional view of the mass airflow sensor shown in FIG. 1. The heavily p-doped silicon rim 2 is shown disposed below the sandwich structure 32 and sensing elements RC1 and RC2 at the interface of the (100)-oriented silicon substrate 8 and the thin dielectric diaphragm window 1. As noted above, the heavily-p-doped silicon rim 2 serves to accurately define the dielectric diaphragm window size while keeping the temperature sensing elements RC1 and RC2 at the ambient air temperature. In fabricating the sensor, the diaphragm window 1 is defined by etching from the backside of the silicon wafers. The heavily-p-doped silicon rim 2 is not etched by the chemical etching solution and thus precisely defines the diaphragm dimensions.

Also shown in FIG. 2 are the thin-film metal layers which are deposited on top of the diaphragm window 1 to form the thin-film heating resistor RH and the temperature sensing resistors RS2 and RS1. The resistors RC1 and RC2 are deposited above the highly thermally conductive silicon rim 2 and the silicon substrate 8 and are used to measure the substrate temperature (the substrate temperature will be very close to the ambient air temperature most of the time). It is noted that depending upon the desired resistance for the temperature sensing and heating elements more than one thin-film element may be disposed in place of the single elements RH, RS1, RS2, RC1 and RC2.

All the thin-film metal resistors are covered with a passivation layer 17. This passivation layer 17 precludes the thin-film metal resistors from being contaminated by ambient air (to prevent, for example, dust particles from accumulating on these elements) which might in time change the devices' response time. In this fashion, the sensor's long-term reliability is enhanced.

The sensor chip edges 18 as shown in FIG. 2 are tapered in order to minimize any undesirable effect arising from inserting the sensor into an air stream. In this regard, the disturbing effect of the air initially striking the chip edge is markedly reduced when compared with a side edge design which is perpendicular to the top surface of the sensor. Below the tapered edges 18, the sensor is shown resting on masking material 7, which may be, for example, the silicon nitride sandwich structure used to fabricate the diaphragm 1.

Figure 4:
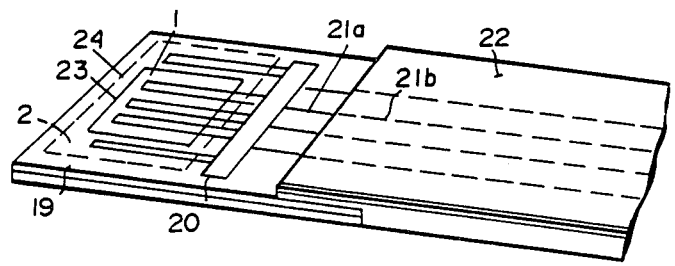
FIG. 4 is a schematic diagram of an airflow sensing system containing on chip readout circuits.

The method of fabricating the mass airflow sensor shown in FIGS. 1 and 2 and 4 is described in detail in the above-mentioned related application of Lee et al entitled "A Si-Based Mass Airflow Sensor and Fabrication Method". The fabrication method described in the Lee et al application is expressly incorporated by reference herein.

The fabricating techniques discussed in this Lee et al application (in conjunction with FIG. 3 therein) are fully compatible with techniques used for silicon IC fabrication. In this regard, some of the fabricating steps discussed in Lee et al may be performed at the same time with typical MOS or bipolar IC fabricating steps. Thus, before the metal films RH, RS1 RS2, RC1 and RC2 are formed, MOS or bipolar devices may be fabricated on the same chip along with the sensor structure. Accordingly, the present invention contemplates that the control and detection circuitry shown in FIG. 3 herein be fabricated on the same sensor chip with the elements shown in FIGS. 1 and 2.

In operation, the sensor shown in FIGS. 1 and 2 is disposed in the appropriate air channel of an electronic fuel management control system such that an airflow is present flowing from the top of the sensor to the bottom in FIG. 1 (and from left to right in FIG. 2.. The readout circuitry initially generates a predetermined amount of current flow through heating element RH. This current flow sets the heating element temperature to a level such that there is a predetermined temperature difference between heating element RH and the non-heated or ambient air temperature sensing element RC1. A primary circuit (discussed below in conjunction with FIG. 3) maintains the temperature difference constant. As will be appreciated by those skilled in the art, the resistivity of the primary and slave circuit elements RH, RS1, RS2, RC1 and RC2 change as a function of temperature change. A slave circuit (discussed below in conjunction with FIG. 3) determines the resistance change at RS2 due to temperature variations which fluctuates as a function of flow.

As will be explained below, the primary circuit, by maintaining a predetermined constant temperature difference between the primary sensing element RS1 (which in the exemplary embodiment is at substantially the same temperature as RH) and an ambient air temperature sensing element RC1, keeps the primary sensing element RS1 at a fixed temperature ($T_{FIXED}$) above the ambient air temperature. At the same time, the primary circuit functions to keep the temperature of the slave circuit temperature sensing element RS2 at a fixed temperature offset (related to $T_{FIXED}$) above the ambient air temperature when there is no flow. Airflow changes the temperature gradient across the diaphragm causing a change in RS2.

The slave circuit utilizes an operational amplifier whose inverting and non-inverting inputs each receive ambient air temperature related signals to cancel out the effects of the ambient air temperature. The output voltage of the slave circuit is a signal which is indicative of airflow.

A microprocessor associated with the electronic fuel management control system determines the airflow based on the slave circuit output data. Based on the airflow, the microprocessor determines the amount of fuel required to get a desired fuel-to-air ratio (e.g., by utilizing well known table look-up techniques). Upon determining the amount of fuel required, the microprocessor sends a corresponding signal to the fuel injector which provides the precise amount of fuel required.

Figure 3:
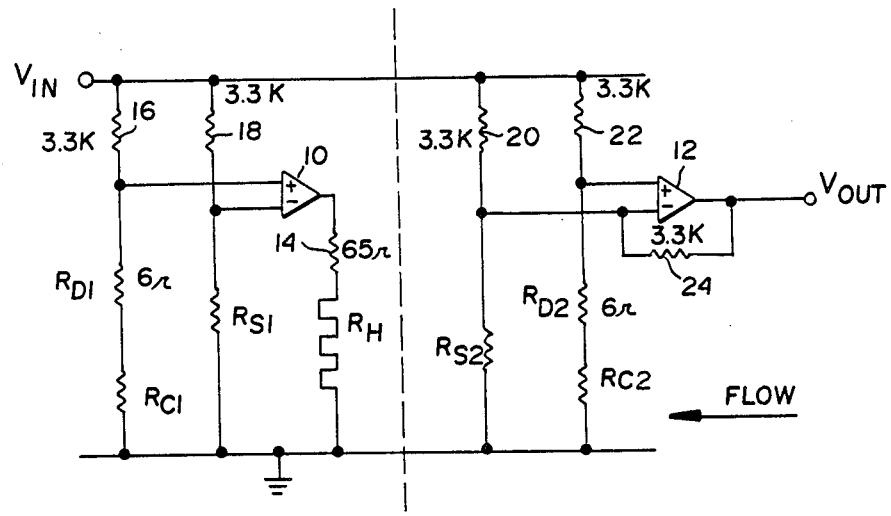
FIG. 3 is a circuit diagram of the heating and temperature sensing elements shown in FIG. 1 together with readout and detection circuitry of the present invention.

Turning next to FIG. 3, this circuit shows how the thin film heating and temperature sensing elements in FIGS. 1 and 2 are connected with readout and control elements to form the primary and slave airflow sensor portions of the present invention. The thin-film resistor elements shown in FIG. 3 correspond with the similarly labeled thin-film resistor elements shown in FIGS. 1 and 2. The resistance values discussed below and shown in FIG. 3 are illustrative only and should not be construed as limiting the present invention.

In FIG. 3, RH is the heating resistor which, by way of example only, has a resistance of 11 ohms in an ambient air or non-heated condition. Resistor RS1 is the primary sensor resistor and has a non-heated resistance of 33 ohms. Resistor RC1 is the primary circuit's non-heated or "cold" resistor. This resistor is disposed on the silicon rim 2 rather than on the diaphragm 1 and has a resistance of 33 ohms. Resistor RS2 is the slave circuit's temperature sensing resistor and has a non-heated resistance of 33 ohms. Finally, resistor RC2 is the slave circuit's "cold" resistor which, like RC1, is disposed on the silicon rim 2 and has a resistance of 33 ohms.

Turning to the details of the primary sensor circuit, resistors 16 and 18, which are shown by way of example only as 3.3K ohms, are current limiting resistors which limit the current through RC1 and RS1, respectively. Thus, for a given voltage $V_{in}$ applied to the primary sensor circuit by selecting the resistance of resistor 16, the current through RC1 can be controlled as desired.

Resistor RD1, which is coupled to resistor 16, interjects an offset between the resistance of RC1 and RS1 which is necessary in order to maintain a predetermined constant temperature difference between RS1 and RC1. In this regard, it is again noted that RC1 and RS1 have the same unheated resistance (as does RS2 and RC2).

Resistor RD1 and resistor 16 are coupled to the positive input of operational amplifier 10. The primary temperature sensing resistor RS1 and resistor 18 are coupled to the negative or inverting input of operational amplifier 10. The output of operational amplifier 10 is coupled to the heating element RH through current limiting resistor 14, which is shown as being 65 ohms, but may be any desired value for limiting the current through heating element RH.

Turning to the slave portion of the circuit, initially it is noted that the temperature control circuitry of the primary circuit is completely electrically separated from the detection circuitry in the slave circuit. This configuration contributes to the sensor's relative independence from changes in ambient air temperature as will be discussed further below.

In the slave circuit, resistors 20 and 22 (like resistors 16 and 18 in the primary circuit) are current limiting resistors which limit the current flow through slave temperature sensing element RS2 and slave non-heated, ambient air temperature sensing element RC2, respectively. Resistor 20 is coupled to slave temperature sensing element RS2, the junction of which is coupled to the negative or inverting input of amplifier 12. Amplifier 12 is a conventional negative feedback (via resistor 24), constant gain operational amplifier.

Resistor 22 is coupled to resistor RD2, which makes up for the offset caused by RS2 set at a different temperature than RC2. The values for RD1 and RD2 shown are illustrative only and assume that RS1 and RS2 are at the same temperature with no flow. The series resistance of ambient air temperature sensing element RC2 and resistor RD2 is the same as the corresponding resistor string RD1 and RC1 in the primary circuit (e.g., 39 ohms). The junction of resistor 22 and resistor RD2 is coupled to the positive or non-inverting input of amplifier 12. The output of operational amplifier 12 is a voltage indicative of airflow.

Turning next to the operation of the circuit of FIG. 3, initially the fixed temperature difference is set with RD1 to maintain a 60° C. temperature difference in the primary circuit. RD2 is adjusted to set the output voltage of, for example, 2 volts when no airflow is present. To maintain a temperature difference of 60° C., a sufficient amount of current is run through RH such that the temperature of RS1 will be 60° C. above the ambient temperature. The temperature of RC1 which is disposed on the silicon rim 2 as shown in FIG. 1, is at ambient temperature. The gain of operational amplifier 12 is adjusted to get maximum output at maximum flow.

Using the exemplary resistance values discussed above, with RC1 having a resistance of 33 ohms and RD1 having a resistance of 6 ohms, the total series resistance of RC1 and RD1 is 39 ohms. The primary sensor resistor RS1 initially has a resistance of 33 ohms, but its resistance will increase upon being heated by current flowing through RH. When RS1 is heated such that its resistance increases to 39 ohms, the current through RH is automatically adjusted to maintain this resistance value of 39 ohms.

When air flows across elements RH and RS1, the primary circuit operates to maintain RS1 at a nearly constant temperature. RH and RS1 are thermally coupled due to their close physical proximity. Thus, when RH is heated, RS1 will have a temperature rise as well. Such a rise in temperature is sensed by operational amplifier 10 to reduce the current through RH to reduce the temperature of RH. The primary circuit operates to maintain the original temperature difference between RS1 and RC1.

With ambient temperature changes, the resistance of RC1 will also change. Correspondingly, the current through RH is adjusted by the output of operational amplifier 10 to maintain the same temperature difference between RS1 and ambient temperature.

In regard to the slave circuit operation, temperature sensing element RS2 is heated by heating element RH via the diaphragm. When air flows across the sensor, sensing element RS2 will change in temperature since it is on the leading edge of the flow and not part of the primary circuit's thermal feedback loop.

Temperature sensing element RS2 detects the temperature which varies in accordance with the airflow at a given point on the diaphragm. The slave circuit via operational amplifier 12 detects the difference between the voltage across RC2 and RD2 and the voltage across RS2. This voltage difference corresponds to the temperature difference between RS2 and RC2, which is at ambient temperature. In this fashion, the original temperature gradient is modified as a function of airflow and reflected in the output voltage $V_{out}$.

Under no flow conditions, RS2 will be at a temperature at some point between the temperature of RH and RC1 depending upon precisely where it is located on the diaphragm. Roughly speaking, the temperature of RS2 will vary linearly as a function of its distance away from resistor RH. In this regard, if element RS2 is halfway between RH and RC1, then the temperature of RS2 will be roughly halfway between ambient temperature and the temperature of RH. Thus, the temperature difference detected by the slave circuit has a predetermined relationship with the fixed temperature difference of the primary circuit.

The temperature of RS2 however will change as a function of flow. While RS2 monitors the heat loss at a particular location on the diaphragm, the amount of such heat loss is dependent on its location on the diaphragm and the flow rate, not on the amount of heat transferred from heating element RH through the air.

Under flow conditions, the detected temperature difference at the slave circuit will be less than the temperature difference at no flow conditions, i.e., the temperature difference between RC2 and RS2 will be less than at zero flow conditions. With RS2 being connected to the negative input of operational amplifier 12, a higher flow results in $V_{out}$ being higher, e.g., 2.5 or 3 volts compared to a zero flow output of 2 volts.

For example, if under no flow conditions resistor RS2 was at a temperature of 75° (e.g., midway between an ambient air temperature of 25° C. and the temperature of RH of 125° C.), under flow conditions the temperature of RS2 would be expected to drop to, for example, 70° C. thereby resulting in a lower temperature difference. This change in temperature of RS2 will change the resistance of RS2. The voltage difference across RS2 and across RD2 and RC2 is amplified by operational amplifier 12 and an output voltage is obtained which is indicative of the airflow and which is independent of the changes in ambient temperature.

The manner in which the primary and slave circuits uniquely provide independence from ambient air temperature may be better understood by the following analysis. The primary circuit, by maintaining a predetermined constant temperature difference between the primary sensing element RS1 (which in the exemplary embodiment is substantially the same as the temperature of RH) and the ambient air temperature sensing element RC1, keeps element RS1 at a fixed temperature ($T_{FIXED}$) above the ambient air temperature ($T_{AMBIENT}$), i.e., Temp RS1=$T_{FIXED}+T_{AMBIENT}$. At the same time, the primary circuit functions to keep the slave temperature sensing element RS2 at a predetermined fixed temperature offset (related to $T_{FIXED}$) above the ambient air temperature reduced by a temperature change due directly to airflow ($T_{FLOW}$), i.e., Temp RS2=$T_{AMBIENT}+T_{FIXED\ OFFSET}-T_{FLOW}$. It is noted that RH supplies the heat to maintain the temperature of RS1. The temperature of RH will always be as hot as necessary to maintain that temperature even if there is a buildup of dust or some other material that changes its thermal resistance.

The voltage across element RS2 (which is proportional to the temperature of element RS2) is applied to the inverting input of the slave circuit operational amplifier 12, whose non-inverting input varies as a function of ambient air temperature. With a signal indicative of ambient air temperature being input to both the inverting and non-inverting inputs of the operational amplifier 12, the effect of ambient air temperature is canceled. The output voltage of the slave circuit is a signal which is indicative primarily only of airflow.

Further contributing to the sensors relative independence from ambient air temperature is the fact that the circuit elements built into the sensor structure are selected to establish common-mode rejection of temperature dependence. In this regard, thin-film temperature sensing resistors have been selected to have the same resistance value and are made of the same materials. These well-matched elements will therefore react to changes in ambient temperature in a uniform manner. In the present sensor such well-matched elements yield accurate airflow measurements whether the ambient temperature is, for example, 0° C. or 100° C. Additionally, the sensor circuit has an excellent power supply rejection ratio due to the well-matched circuit components. Thus, if there is a change in power supply voltage, the current through the sensor element resistors will change in a uniform manner to minimize the effect of the power supply change.

Turning next to FIG. 4, this figure shows an airflow sensing subsystem containing on chip readout circuitry. In this regard, the airflow sensor shown in FIGS. 1 and 2 is schematically represented at 19 in FIG. 4 and the on-chip readout circuit is shown at 20. The on-chip readout circuit 20 is connected to an external microprocessor control circuit and power supply (not shown) via electrical connections 21a. Between the dashed-line rectangle 24 and the solid rectangle 23 lies the p-etch-stopped region 2. Within the rectangle 23 lies the diaphragm window 1. The sensor chip is supported by a ceramic substrate 22 which contains the electrical connections 21b. The entire subsystem is then disposed in the appropriate air channel.

The configuration of FIG. 4 contemplates that solder bumping or tape-automated bonding may be utilized for directly connecting the electrical connectors 21b in the ceramic substrate with the electrical connectors 21a on the chip. Thus, wire-type bonding is not necessary in this system although any bonding method is applicable to the present invention. This overall configuration has many advantages over prior art mass airflow sensors, including enhanced noise immunity, reduced overall packaging costs and improved manufacturing yield.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mass airflow sensor comprising:
   a substrate having a thin dielectric diaphragm surrounded by a heavily doped silicon rim; with
   a primary circuit, disposed on said substrate, including:
   a heating element disposed on said substrate diaphragm,
   a first non-heated ambient temperature sensing means (RC1) disposed on said substrate rim and thermally isolated from said heating element for sensing ambient temperature,
   a first heated temperature sensing means (RS1) disposed on said substrate diaphragm and thermally coupled to said heating element through said diaphragm for sensing temperature, and
   first means, electrically coupled to said heating element, said first heated temperature sensing means (RS1), and said non-heated ambient temperature sensing means (RC1), for maintaining a substantially constant temperature difference between the temperature of said heating element and the ambient temperature sensed by said non-heated, ambient temperature sensing means, said first means including means for applying a continuous current flow to said heating element and for continually adjusting the magnitude of said current flow in response to the difference between the temperature sensed by said temperature sensing means (RS1) and the ambient temperature sensed by said non-heated temperature sensing means (RC1); and a slave circuit operating independently of said primary circuit but thermally coupled to said heating element through said substrate, said slave circuit comprising:

a second non-heated ambient temperature sensing means (RC2) disposed on said substrate rim and thermally isolated from said heating element for measuring ambient air temperature, a second heated temperature sensing means (RS2) disposed on said substrate diaphragm in an air flow stream and thermally coupled to said heating element through said substrate diaphragm for sensing temperature, and second means, coupled to said second non-heated ambient temperature sensing means (RC2) and to said second heated temperature sensing means (RS2) for generating a signal indicative of the flow of said air flow stream.

2. A sensor according to claim 1, wherein and said first non-heated ambient air temperature sensing element is disposed over said semiconductor rim.

3. A sensor according to claim 1, wherein said first means includes primary operational amplifier means having a first input coupled to said first non-heated ambient air temperature sensing element and an output coupled to said heating element for controlling the current through said heating element to maintain a constant temperature difference between the temperature of said first non-heated ambient air temperature sensing element and said heating element.

4. A sensor according to claim 3, wherein said first heated temperature sensing means is coupled to a second input of said primary operational amplifier means, said first heated temperature sensing means being thermally coupled to said heating element such that the primary temperature sensing element is heated to substantially the same temperature as said heating element.

5. A sensor according to claim 3, wherein said first non-heated, ambient temperature sensing means is coupled to said first input via offset means for setting a predetermined temperature difference between said first heated temperature sensing means and said first non-heated ambient temperature sensing means.

6. A sensor according to claim 3, further including means for limiting the current through said heating element, wherein said heating element is coupled to said operational amplifier means output via said means for limiting current.

7. A sensor according to claim 1, wherein said second means includes means for generating an output signal indicative of a temperature difference which is different than said constant temperature difference.

8. A sensor according to claim 7, wherein said means for generating includes slave operational amplifier means for generating said output signal, said output signal being indicative of airflow.

9. A sensor according to claim 8, wherein said slave operational amplifier means includes a first input coupled to said second heated temperature sensing means.

10. A mass airflow sensor comprising:
a heating element;
a non-heated ambient air temperature sensing element;
at least one additional temperature sensing element;
first means, coupled to said heating element and to said non-heated ambient air temperature sensing element, for maintaining a substantially constant temperature difference between a temperature related to the temperature of said heating element and the temperature of said non-heated, ambient air temperature sensing element;
second means, coupled to said at least one additional temperature sensing element for generating a signal indicative of airflow;
a dielectric diaphragm, wherein said heating element and said at least one additional temperature sensing element are disposed on said dielectric diaphragm; and
a highly doped thermally conductive semiconductor rim surrounding said dielectric diaphragm.

11. A mass airflow sensor comprising:
a heating element;
a non-heated ambient air temperature sensing element;
at least one additional temperature sensing element;
first means, coupled to said heating element and to said non-heated ambient air temperature sensing element, for maintaining a substantially constant temperature difference between a temperature related to the temperature of said heating element and the temperature of said non-heated, ambient air temperature sensing element;
second means, coupled to said at least one additional temperature sensing element for generating a signal indicative of airflow, said second means including means for generating an output signal indicative of a temperature difference which is different than said constant temperature difference, said means for generating including slave operational amplifier means for generating said output signal, said output signal being indicative of airflow, said slave operational amplifier means including a first input coupled to said at least one additional temperature sensing element; and
a slave ambient air temperature sensing means, said slave ambient air temperature sensing means being coupled to a second input of said slave operational amplifier means,
wherein said slave ambient air temperature sensing element is coupled to said first input of said slave operational amplifier means via offset means for setting a temperature difference in said second means related to the temperature differential maintained in said first means.

12. A mass airflow sensor comprising:
a heating element;
a primary ambient air temperature sensing element;
a slave temperature sensing element thermally coupled to said heating element;
primary circuit means coupled to said heating element and said primary ambient air temperature sensing element for maintaining a constant temperature difference between the temperature of said heating element and the temperature of said ambient air temperature sensing element; and slave circuit means electrically coupled to said slave temperature sensing element, electrically decoupled from said primary circuit means, and coupled to said primary circuit means only through said thermal coupling between said slave temperature sensing element and said heating element, for detecting temperature variations between said slave temperature sensing element and the ambient air and for generating an output signal indicative of airflow which is independent of ambient air temperature;

wherein said sensor further includes a substrate, and said primary and slave temperature sensing elements have substantially the same resistance and each comprise thin film resistors disposed on said substrate.

13. A mass airflow sensor according to claim 12, further including a heated primary temperature sensing element, wherein said temperature related to the temperature of said heating element is the temperature of said heated primary temperature sensing element.

14. A sensor according to claim 12, further including a dielectric diaphragm, wherein said heating element and said slave temperature sensing element are disposed on said dielectric diaphragm.

15. A sensor according to claim 12, wherein said primary circuit means includes means for sensing the temperature difference between the heating element and the primary ambient air temperature sensing element and having a first input coupled to said primary ambient air temperature sensing element and an output coupled to said heating element for continuously applying current to said heating element and for controlling the amount of current flowing through said heating element to maintain a constant temperature difference between the temperature of said primary ambient temperature sensing element and said heating element.

16. A sensor according to claim 15, further including a primary temperature sensing element coupled to a second input of said means for sensing the temperature difference, said primary temperature sensing element being thermally coupled to said heating element such that the primary temperature sensing element is heated to substantially the same temperature as said heating element.

17. A sensor according to claim 15, wherein said primary ambient air temperature sensing element is coupled to said first input via offset means for setting a predetermined temperature difference between said heating element and said primary ambient air temperature sensing element.

18. A sensor according to claim 12, wherein said means for generating includes a slave temperature difference sensing means for generating said output signal, said output signal being indicative of airflow.

19. A sensor according to claim 18, wherein said slave temperature difference sensing means includes a first input coupled to said slave temperature sensing element.

20. A sensor according to claim 19, further including a slave ambient air temperature sensing means, said slave ambient air temperature sensing means being coupled to a second input of said slave temperature difference sensing means.

21. A mass airflow sensor comprising:
a heating element;
a primary ambient air temperature sensing element,
a slave temperature sensing element;
primary circuit means coupled to said heating element and said primary ambient air temperature sensing element for maintaining a constant temperature difference between a temperature related to the temperature of said heating element and the temperature of said ambient air temperature sensing element;
slave circuit means coupled to said slave temperature sensing element for detecting temperature variations between said slave temperature sensing element and the ambient air and for generating an output signal indicative of airflow which is independent of ambient air temperature;
a heated primary temperature sensing element, wherein said temperature related to the temperature of said heating element is the temperature of said heated primary temperature sensing element;
a dielectric diaphragm, wherein said heating element and said slave temperature sensing element are disposed on said dielectric diaphragm; and
a highly doped thermally conductive semiconductor rim surrounding said dielectric diaphragm.

22. A mass airflow sensor comprising:
a heating element;
a primary ambient air temperature sensing element;
a slave temperature sensing element;
primary circuit means coupled to said heating element and said primary ambient air temperature sensing element for maintaining a constant temperature difference between a temperature related to the temperature of said heating element and the temperature of said ambient air temperature sensing element;
slave circuit means coupled to said slave temperature sensing element for detecting temperature variations between said slave temperature sensing element and the ambient air and for generating an output signal indicative of airflow which is independent of ambient air temperature, said means for generating including a slave temperature difference sensing means for generating said output signal, said output signal being indicative of airflow, said slave temperature difference sensing means including a first input coupled to said slave temperature sensing element;
a slave ambient air temperature sensing means, said slave ambient air temperature sensing means being coupled to a second input of said slave temperature difference sensing means,
wherein said slave ambient air temperature sensing element is coupled to said first input of said slave temperature difference sensing means via offset means for setting a temperature difference in said slave circuit means related to the temperature differential maintained in said primary circuit means.

23. An airflow detector which produces an electrical output signal indicative of airflow thereover but substantially independent of the ambient temperature of such airflow, said detector comprising:
a substrate comprising a thin dielectric diaphragm surrounded by a heavily doped semiconductor rim;
first means providing a first electrical signal including a first portion thereof representing the ambient temperature of airflow passing over said detector and a second portion thereof representing the flowing air mass, said first means including a first ambient temperature sensing means disposed on said rim for measuring the ambient temperature of said rim and heat generating means connected to said first ambient temperature sensing means for heating a location on said diaphragm to a certain temperature above said measured ambient temperature;

second means providing a second electrical signal including at least a portion thereof representing the ambient temperature of airflow passing over said detector, said second means including a second ambient temperature sensor disposed on said rim for measuring ambient temperature and an air flow temperature sensor disposed on said diaphragm a certain distance from said heated location and also disposed to be impacted by the air flow to be measured, said air flow temperature sensor being thermally coupled to said heated location through said thin dielectric diaphragm; and third means connected to said air flow temperature sensor and said second ambient temperature sensor for deriving a difference between the ambient temperature measured by said second ambient temperature sensing means and the air flow temperature measured by said air flow temperature sensor and for producing said electrical output signal indicative of airflow over said detector but substantially independent of the ambient temperature of such airflow.

24. A mass airflow sensor comprising:
a heating element;
a primary ambient air temperature sensing element;
a slave temperature sensing element thermally coupled to said heating element;
primary circuit means coupled to said heating element and said primary ambient air temperature sensing element for maintaining a constant temperature difference between the temperature of said heating element and the temperature of said ambient air temperature sensing element;
slave circuit means electrically coupled to said slave temperature sensing element, electrically decoupled from said primary circuit means, and coupled to said primary circuit means only through said thermal coupling between said slave temperature sensing element and said heating element, for detecting temperature variations between said slave temperature sensing element and the ambient air and for generating an output signal indicative of airflow which is independent of ambient air temperature;
a dielectric diaphragm, wherein said heating element and said slave temperature sensing element are disposed on said dielectric diaphragm; and
a highly doped thermally conductive semiconductor rim surrounding said dielectric diaphragm.

25. A sensor according to claim 24, wherein said primary ambient air temperature sensing element is disposed over said semiconductor rim.

26. An airflow sensor comprising:
first sensing means (RC1) for measuring ambient temperature and for producing a first temperature signal responsive to said measured ambient temperature;
heating means (RH) for producing heat in response to a heat control signal applied thereto;
second sensing means (RS2) thermally coupled to said heating means for producing a second temperature signal responsive to the temperature of said heating means;
first differential amplifier means (10), connected to receive said first and second temperature signals and also connected to said heating means and to produce said heat control signal responsive to the difference between said measured ambient temperature and said heating means temperature, for maintaining said heating element at a temperature elevated by a predetermined offset from the measured ambient temperature;
third sensing means (RS2) thermally coupled to said heating means for producing a third temperature signal responsive to the temperature of said heating means and also responsive to heat removed by air flow;
fourth sensing means (RC2) for measuring ambient temperature independently from said measurement performed by said first sensing means and for producing a fourth temperature signal responsive to said measured ambient temperature; and
second differential amplifier means (12), connected to receive said third and fourth temperature signals, for producing an output signal responsive to the rate of said air flow and independent of the change in said ambient temperature;
wherein said second temperature sensing means is disposed downstream of said heating means relative to said air flow.

27. A sensor as in claim 26 further including:
a first offset means (RD1) connected to said first temperature sensing means (RC1) for establishing said predetermined offset.

28. A sensor as in claim 26 wherein said first differential amplifier means continuously applies a current to said heating element and adjusts the magnitude of said continuous current in response to said temperature difference.

29. A sensor as in claim 26 wherein said second differential amplifier means is electrically decoupled from said first differential amplifier means.

30. A sensor as in claim 26 wherein said first, second, third and fourth temperature sensing means each comprise a thin film resistor.

31. An air flow sensor comprising:
first sensing means (RC1) for measuring ambient temperature and for producing a first temperature signal responsive to said measured ambient temperature;
heating means (RH) for producing heat in response to a heat control signal applied thereto;
second sensing means (RS1) thermally coupled to said heating means for producing a second temperature signal responsive to the temperature of said heating means;
first differential amplifier means (10), connected to receive said first and second temperature signals and also connected to said heating means and to produce said heat control signal responsive to the difference between said measured ambient temperature and said heating means temperature, for maintaining said heating element at a temperature elevated by a predetermined offset from the measured ambient temperature;
third sensing means (RS2) thermally coupled to said heating means for producing a third temperature signal responsive to the temperature of said heating means and also responsive to heat removed by air flow;

fourth sensing means (RC2) for measuring ambient temperature independently from said measurement performed by said first sensing means and for producing a fourth temperature signal representative to said measured ambient temperature;

second differential amplifier means (12), connected to receive said third and fourth temperature signals, for producing an output signal responsive to the rate of said air flow and independent of the changes in said ambient temperature;

a first offset means (RD1) connected to said first temperature sensing means (RD1) for establishing said predetermined offset; and a second offset means (RC2) connected to said fourth temperature sensing means (RC2) for compensating for said predetermined offset.

32. A sensor as in claim 31 wherein said first and second offset means comprise resistive elements providing substantially equal resistance values.

33. An air flow sensor comprising:

first sensing means (RC1) for measuring ambient temperature and for producing a first temperature signal responsive to said measured ambient temperature;

heating means (RH) for producing heat in response to a heat control signal applied thereto;

second sensing means (RS1) thermally coupled to said heating means for producing a second temperature signal responsive to the temperature of said heating means;

first differential amplifier means (10), connected to receive said first and second temperature signals and also connected to said heating means and to produce said heat control signal responsive to the difference between said measured ambient temperature and said heating means temperature, for maintaining said heating element at a temperature elevated by a predetermined offset from the measured ambient temperature;

third sensing means (RS2) thermally coupled to said heating means for producing a third temperature signal responsive to the temperature of said heating means and also responsive to heat removed by air flow;

fourth sensing means (RC2) for measuring ambient temperature independently from said measurement performed by said first sensing means and for producing a fourth temperature signal responsive to said measured ambient temperature; and second differential amplifier means (12), connected to receive said third and fourth temperature signals, for producing an output signal responsive to the rate of said air flow and independent of the changes in said ambient temperature;

wherein:

said sensor further includes a semiconductor substrate having a dielectric diaphragm surrounded by a heavily doped rim;

said heating means, second temperature sensing means and third temperature sensing means are all disposed on said dielectrical diaphragm and thermally coupled to one another through said diaphragm; and said first and fourth temperature sensing means are each disposed on said rim and thermally decoupled from said heating means by said rim.

* * * * *